US007558755B2

(12) United States Patent
Mott

(10) Patent No.: US 7,558,755 B2
(45) Date of Patent: Jul. 7, 2009

(54) METHODS AND SYSTEMS FOR VALUING INVESTMENTS, BUDGETS AND DECISIONS

(76) Inventor: Antony R. Mott, 319 W. 103 St., 4th Floor, New York, NY (US) 10025-4469

( * ) Notice: Subject to any disclaimer, the term of this patent is extended or adjusted under 35 U.S.C. 154(b) by 648 days.

(21) Appl. No.: 11/180,741

(22) Filed: Jul. 13, 2005

(65) Prior Publication Data

US 2007/0016498 A1    Jan. 18, 2007

(51) Int. Cl.
*G06Q 40/00*    (2006.01)
*G06F 17/30*    (2006.01)
(52) U.S. Cl. .............................. 705/37; 705/35; 705/36; 705/36 R; 705/38; 705/1; 382/107
(58) Field of Classification Search ...................... 705/1, 705/35, 36, 36 R, 37, 38; 382/107
See application file for complete search history.

(56) References Cited

U.S. PATENT DOCUMENTS

| 5,301,118 | A |   | 4/1994  | Heck |            |
|-----------|---|---|---------|------|------------|
| 5,692,233 | A |   | 11/1997 | Garman |          |
| 5,727,161 | A |   | 3/1998  | Purcell |         |
| 5,812,988 | A | * | 9/1998  | Sandretto | 705/36 R |
| 5,852,811 | A | * | 12/1998 | Atkins | 705/36 R |
| 6,032,123 | A |   | 2/2000  | Jameson |         |
| 6,122,623 | A |   | 9/2000  | Garman |          |
| 6,167,384 | A | * | 12/2000 | Graff | 705/35 |
| 6,192,347 | B1 | * | 2/2001  | Graff | 705/36 R |
| 6,317,700 | B1 |   | 11/2001 | Bagne |          |
| 6,381,586 | B1 |   | 4/2002  | Glasserman |     |
| 6,507,661 | B1 | * | 1/2003  | Roy | 382/107 |
| 6,734,848 | B2 |   | 5/2004  | Bires |          |
| 6,760,709 | B2 | * | 7/2004  | Graff | 705/35 |

(Continued)

FOREIGN PATENT DOCUMENTS

WO    WO0219190 A1    3/2002

(Continued)

OTHER PUBLICATIONS

Donald H. Sanders, Statistics: A First Course, McGraw-Hill, Inc., Fifth Ed., pp. 128-130.*

(Continued)

*Primary Examiner*—James P Trammell
*Assistant Examiner*—B. Joan Amelunxen
(74) *Attorney, Agent, or Firm*—Jennifer Meredith, Esq.; Meredith & Keyhani, PLLC

(57) ABSTRACT

A computer implemented method of valuing and modeling an investment comprising the steps of: providing at least one investment for consideration comprised of at least one future cash flow; creating at least one probability distribution for each future cash flow, by a user, each probability distribution to represent uncertainty of magnitude at at least one particular time to provide at least one magnitude distribution; creating at least one probability distribution for each future cash flow, by a user, each probability distribution to represent uncertainty of timing at at least one particular magnitude to provide at least one timing distribution; combining the magnitude distributions and at least one timing distribution into at least one joint-probability distribution function; and converting at least one joint-probability distribution function to generate a two-dimensional net present value probability distribution.

12 Claims, 5 Drawing Sheets

U.S. PATENT DOCUMENTS

| | | |
|---|---|---|
| 6,772,136 B2 | 8/2004 | Kant |
| 7,003,490 B1 * | 2/2006 | Keyes .......................... 705/38 |
| 7,039,608 B2 * | 5/2006 | Johnson et al. ........... 705/36 R |
| 7,082,411 B2 * | 7/2006 | Johnson et al. ............... 705/37 |
| 7,162,445 B2 * | 1/2007 | Johnson et al. ............... 705/35 |
| 7,203,661 B1 * | 4/2007 | Graff ....................... 705/36 R |
| 7,236,953 B1 * | 6/2007 | Cooper et al. ............. 705/36 R |
| 7,346,570 B2 * | 3/2008 | Raynes et al. ............. 705/36 R |
| 2001/0027388 A1 | 10/2001 | Beverina |
| 2002/0049653 A1 * | 4/2002 | Johnson et al. ............... 705/35 |
| 2002/0049659 A1 * | 4/2002 | Johnson et al. ............... 705/37 |
| 2002/0055897 A1 * | 5/2002 | Shidler et al. ................. 705/35 |
| 2002/0065752 A1 * | 5/2002 | Lewis .......................... 705/35 |
| 2003/0033229 A1 * | 2/2003 | Keyes et al. ................. 705/36 |
| 2003/0046105 A1 * | 3/2003 | Elliott ........................... 705/1 |
| 2003/0055761 A1 * | 3/2003 | Sekimoto ..................... 705/35 |
| 2003/0061064 A1 * | 3/2003 | Elliott ........................... 705/1 |
| 2003/0069817 A1 * | 4/2003 | Graff ........................... 705/35 |
| 2003/0088492 A1 | 5/2003 | Damschroder |
| 2003/0126054 A1 * | 7/2003 | Purcell, Jr. ................... 705/36 |
| 2003/0130920 A1 * | 7/2003 | Freund ........................ 705/35 |
| 2003/0130934 A1 * | 7/2003 | Saunders ..................... 705/38 |
| 2004/0015376 A1 | 1/2004 | Zhu |
| 2004/0039667 A1 * | 2/2004 | Winklevoss et al. ........... 705/35 |
| 2004/0088236 A1 * | 5/2004 | Manning ..................... 705/35 |
| 2004/0095349 A1 | 5/2004 | Bito |
| 2004/0181491 A1 | 9/2004 | Sato |
| 2004/0236667 A1 * | 11/2004 | Cotton ........................ 705/37 |
| 2005/0004833 A1 * | 1/2005 | McRae et al. ................. 705/11 |
| 2005/0010510 A1 * | 1/2005 | Brose et al. ................... 705/35 |
| 2005/0021435 A1 * | 1/2005 | Hakanoglu et al. ............ 705/36 |
| 2005/0222930 A1 * | 10/2005 | Graff ........................... 705/35 |
| 2005/0251468 A1 * | 11/2005 | Eder ........................... 705/35 |
| 2006/0224487 A1 * | 10/2006 | Galdi ........................... 705/35 |
| 2006/0282358 A1 * | 12/2006 | Cavin et al. ................. 705/35 |
| 2007/0005477 A1 * | 1/2007 | McAtamney ................ 705/35 |
| 2007/0156555 A1 * | 7/2007 | Orr ............................. 705/35 |
| 2007/0168270 A1 * | 7/2007 | De Diego Arozamena et al. ........................ 705/36 R |
| 2007/0219895 A1 * | 9/2007 | Cooper et al. ............. 705/36 R |

FOREIGN PATENT DOCUMENTS

| | | |
|---|---|---|
| WO | WO02097574 A2 | 12/2002 |
| WO | WO03017683 A2 | 2/2003 |

OTHER PUBLICATIONS

Jesus Ruiz-Mata, Modeling Market and Credit Risk and Validation of Models, PhD Thesis, Columbia University, 2005.*

Donald H. Sanders, Statistics, A first Course, $5^{th}$ edition, McGraw-Hill, Inc. 1995, pp. 128-129.*

* cited by examiner

Button Settings

| | | | | | | | |
|---|---|---|---|---|---|---|---|
| $\mu_1$ | -3 | △▢▽ | 47 | $\mu_3$ | 11 | △▢▽ | 61 |
| $\gamma_1$ | 26.5 | △▢▽ | 53 | $\gamma_3$ | 50 | △▢▽ | 100 |
| $\beta_1$ | 1.1 | △▢▽ | 11 | $\beta_3$ | 0.2 | △▢▽ | 2 |
| $\mu_2$ | 1 | △▢▽ | 51 | $\mu_4$ | 5 | △▢▽ | 55 |
| $\gamma_2$ | 9.5 | △▢▽ | 19 | $\gamma_4$ | 5 | △▢▽ | 10 |
| $\beta_2$ | 0.8 | △▢▽ | 8 | $\beta_4$ | 1.4 | △▢▽ | 14 |
| $\omega_T$ | 0.7 | △▢▽ | 70 | $\omega_T$ | 0.34 | △▢▽ | 34 |

| | | | |
|---|---|---|---|
| Origin | 3 | 3 | △▢▽ |
| Interval size | 0.5 | 0.5 | △▢▽ |

METHODS AND SYSTEMS FOR VALUING INVESTMENTS, BUDGETS AND DECISIONS

BACKGROUND OF THE INVENTION

This invention relates generally to valuation methods and systems for the purpose of decision making, including pricing financial options and other derivatives and more particularly to methods and systems for predicting valuations utilizing more accurate techniques than that of the prior art.

Investment decisions largely determine the generation of wealth over time. However, people continually make investment decisions that turn out to be poor decisions. Investment decision rules can help users select an investment from among two or more investments such that the chosen investment will be the one with the highest net present value. The term investment decision rules may include terms "valuation", "capital budgeting" and "investment-decision modeling". The net present value of an investment is a current dollar estimate for the sum of all cash outflows and inflows throughout the investment's life, taking into account the time value of money.

Prior art methods of valuing an investment or decision do not generate reliable predictions and ignore many important factors that should be taken into account when valuing an investment or decision. For example, those who use predictive methods possess critically important knowledge about the degree of uncertainty that surrounds a future event. A user may know the approximate timeframe within which an event will take place, or a finite range of possible values for an event. Prior-art methods accept only one or two numbers, or offer a limited set of distributions, to describe the uncertainty surrounding a future event, so users must simplify knowledge to accommodate the input limitations of prior art methods. Any knowledge that the user has about uncertainty that cannot be expressed in one or two numbers, or by the limited set of distributions offered, is lost.

Prior art methods include: comparable transaction method; multiples method; ordinary payback period method; discounted payback period method; internal rate of return method; profitability index method; net present value methods; real options method; and Monte Carlo Simulation.

The comparable transaction method uses the recent sale price of a similar investment as a proxy price for an investment under consideration. The problem with this method is that it: ignores the timing of future cash flows; does not take investment risk into account; does not separate the risk of timing from the risk of magnitude; ignores the value created by opportunities to make changes to the investment through time as more information becomes available; is inaccurate if the recent sale price of the proxy investment is not representative of the investment under consideration; requires at least one recent sale of a comparable investment when there may have been none; and generates a single number for the valuation result when a probability distribution is more accurate.

The multiples method is widely used and simple to calculate. The multiples method multiplies an historical performance metric of an investment by a market-determined factor. Two examples of performance metrics used in the multiples method to value companies are: price/earnings ratio, and earnings before interest, tax, depreciation and amortization. The multiples method can lead to an incorrect investment decision because the method: ignores timing of future cash flows; ignores investment risk; ignores the value created by opportunities to make changes to the investment through time as more information becomes available; relies on market-determined factors which are arbitrarily assigned, usually across an industry, sector or other broad category, and may not be relevant to the investment under consideration; is sensitive to historical performance and accounting metrics which may have been manipulated, or may not represent future performance metrics; and generates a single number for the valuation result when a probability distribution is more accurate.

The payback period method is widely used and simple to calculate. This method is widely used and simple to calculate. The payback period method calculates the number of periods (usually measured in years) required for the sum of the project's expected cash flows to equal its initial cash outlay. According to the payback period method, a project is acceptable if its payback period is shorter than or equal to a specified numbers of periods. If the choice is between several mutually exclusive projects, the one with the shortest payback period should be selected. The payback period method favors projects that pay back quickly which is popular because early payback contributes to a firm's overall liquidity. The payback period method can lead to an incorrect investment decision because the method: ignores timing of future cash flows; ignores investment risk; ignores the value created by opportunities to make changes to the investment through time as more information becomes available; ignores expected cash flows beyond the cutoff period and as such is biased against long-term investments; and generates a single number for the valuation result when a probability distribution is more accurate.

The discounted payback period method, also known as economic payback period method, is less widely used and more difficult to calculate, the discounted payback period method calculates the number of periods, usually measured in years, required for the sum of the present values of the project's expected cash flows to equal its initial cash outlay. Unlike the payback period method, the discounted payback period method partly takes into account the time value of money and the project risk. The discounted payback period method, though, can lead to an incorrect investment decision because it: ignores the timing of future cash flows beyond the payback period; ignores investment risk beyond the payback period; does not separate the risk of timing from the risk of magnitude; ignores the value created by opportunities to make changes to the investment through time as more information becomes available; is biased against long-term investments; and generates a single number for the valuation result when a probability distribution is more accurate.

The internal rate of return method is widely used yet difficult to calculate, the internal rate of return method calculates a discount rate that makes the net percent value of the investment equal to zero. An investment should be accepted if its internal rate of return is higher that it's cost of capital (a minimum rate of return set by the investor) and should be rejected if it is lower. The internal rate of return method takes in account the time value of money. The risk of an investment does not enter into the computation of its internal rate of return. However, the internal rate of return method does consider the risk of the investment because the method compares the project's internal rate of return with the minimum rate of return. The comparison substitutes as a measure of investment risk. The internal rate of return method can lead to an incorrect investment decision because the method: can generate more than one internal rate of return or none at all if the sequence of future cash flows contains one or more negative cash flows; does not separate the risk of timing from the risk of magnitude; ignores the value created by opportunities to make changes to the investment through time as more information becomes available; and generates a single number for the valuation result when a probability distribution The probability index method calculates the ratio of the present value of the investment's expected cash-flow stream to its initial cash outlay:

$$\text{Profitability index} = \frac{\text{Present value}(CF_1, CF_2, \ldots, CF_n)}{\text{Initial cash outlay}}$$

$CF_1, CF_2, \ldots CF_n$=cash flows generated by the investment

According to the profitability method, an investment should be accepted if its profitability index is greater than one and rejected if it is less than one. The Profitability index method takes into account both the time value of money and the risk of an investment because the project's cash flows are discounted at their cost of capital. The profitability index method can lead to an incorrect investment decision because the method does not differentiate between investments with different cash outlays because the rule provides relative not absolute measurements, does not separate the risk of timing from the risk of magnitude, ignores the value created by opportunities to make changes to the investment through time as more information becomes available and generates a single number for the valuation result when a probability distribution is more accurate.

The Net present value methods (also known as discounted cash flow methods) calculate a current-dollar estimate for the sum of all cash flows to and from an investment over the investments life, taking into account the time value of money. Net present value methods apply a discount rate to each future cash flow to take account of the time value of money. Variations of net present value methods include: economic profit method, adjusted present value method, and equity discounted cash flow method. Examples of software that embody net present value methods include: Excel, Matlab and Crystal Ball.

Net present value methods (DCF methods) measure value creation, adjust for the timing of expected cash flows, adjust for risk of expected cash flows and are additive. Net present value methods can lead to incorrect investment decisions because the methods: usually apply a single discount rate to all cash flows even though different discount rates should be applied to each cash flow depending on the risks of that cash flows; do not separate the risk of timing from the risk of magnitude; do not lend themselves to the use of multiple discount rate; overvalue near-term future cash flows and undervalue distant cash flows because the methods assume that uncertainty is directly proportional to time when uncertainty is proportional to the square root of time; assume that investment returns, when express as a percentage, are log-normally distributed, when in fact, they are not; are complex to apply to two or more projects of unequal size or unequal life spans; ignore the value created by opportunities to make changes to the investment through time as more information becomes available; and generate a single number for the valuation result when a probability distribution is more accurate.

Also known within the art is the use of equations. Mathematicians, physicists, engineers, and analysts who build computer programs to solve partial differential equation ("PDE") modeling problems must be familiar not only with the mathematics and physics of their problems, but also with a variety of technological tools. Pragmatically, this problem-solving process involves thinking in terms of the tools, e.g., numerical software libraries, existing codes, and systems for connection software components. Decisions made using equations can suffer because, due to the complexity of the equations, more energy and effort is devoted to coding a solution than understanding the fundamentals of the problem.

Many problems in science, engineering, or finance can be modeled using partial differential equations. While many techniques are widely used for finding a solution for these PDE problems, producing accurate software code to generate a solution is difficult and time consuming. Programming such software code requires extensive domain knowledge of the problem, an understanding of the math, an understanding of advanced computer science techniques, and extensive testing and debugging. Therefore, other techniques are often used to model such problems.

Investment banks and derivative brokers make extensive use of sophisticated mathematical models to price the instruments, and once sold, to hedge the risk in their positions. The models used are basically of four types: analytical models, and three versions of approximate numerical models: Monte Carlo, lattices (binomial and trinomial trees) and finite differences. Monte Carlo simulation is a technique for estimating the solution of a numerical mathematical problem by means of an artificial sampling environment. This is an established numerical method for the valuation of derivatives securities. It major strength is flexibility, and it may be applied to almost any problem, including history-dependant claims or empirically characterized security processes.

Also known within the art are a host of simplifications, e.g., constant interest rates, constant volatility of the underlying assets, continuously paid dividends, etc, which allow analytic solutions to the Black-Scholes equation, the basic partial differential equation describing derivative securities. These analytic solutions are packaged in software libraries of "analytics". Many packages exist. They may be used by traders for rough estimates, but all the assumptions required to make analytic solutions possible, usually render them too inaccurate for pricing complex derivative products. Major investment banks usually strip them out of any integrated software systems they may buy, and substitute their own numerical models.

Monte Carlo models calculate the value of an option by simulating thousands or millions of possible random paths the underlying assets prices may take, and averaging the option value over this set. Some early exercise features, i.e., American options, are unreliably priced, and the values of critical hedging parameters are often imprecise. Option parameters calculated in this way may converge to the correct answer slowly and are computationally expensive.

Monte Carlo simulation methods can lead to incorrect investment decisions because the methods: do not separate the risk of time from the risk of magnitude; do not lend themselves to use of multiple discount rates; allow the user only a limited set of distributions which do not match some future cash; assume that investment returns, when expressed as a percentage, are log-normally distributed, when in fact, they are not; are complex to apply to two or more projects of unequal size or unequal life spans; are complicated to understand; are tedious and time-consuming to apply correctly; and ignore the value created by opportunities to make changes to the investment through time as more information becomes available.

The real options method calculates a dollar value for management's opportunity to make changes to the investment through time as more information becomes available. The word "option" refers to management's choice to do, or not do, something in the future. The real options method is usually used in addition with the net present value method. Managers have many opportunities to enhance the value of an investment during its lifetime as circumstances change. Real options include: the option to expand, contract, delay or abandon a project at various stages of its like. Real options can be exercised to alter a project during its useful like. Options embedded in an investment are either worthless or have a positive value, so that net present value of an investment will always underestimate the value of an investment project unless it includes a value for real options. Real options are sometimes known as flexibility options. The value of an investment can and does change throughout the investment's life. For example, the cost of capital depends on information available at the time the investment is valid. The cost of capital takes into account many factors including: marketability of the product, selling price, risk of obsolescence, technology used in manufacturing, economic, regulatory, and tax environments. An investment that permits its management to adjust easily and at low cost to significant changes in these factors is more valuable than an investment that won't. The option to abandon a project is particularly valuable in the mining and oil extraction industries where the output (mineral or oil) prices are volatile. For example, the net present value of an oil reserve may be negative given the current market expectations regarding the future price of oil, however, because the development of the reserve can be postponed perhaps for many years, the capital expenditures needed to start the extraction of oil can be deferred until the market prices rise. And the more volatile the oil prices, the higher the chance that the net present value of the reserve will become positive and the higher the value of the option to defer the development of the reserve.

The real option method can lead to an incorrect investment decision because the method: requires information that may be difficult to obtain, unreliable or unavailable; requires information that, even if available and reliable, is usually misunderstood by those who are capable of using the method; is difficult to apply because it usually requires the adaptation or use of complex formulas and valuation concepts originally used to value options on financial instruments; due to the methods complexity, disqualifies valuable input from users who are knowledgeable yet innumerate; assumes that investment returns, when expressed as a percentage, are log-normally distributed, when they are not; is complex to apply to two or more projects of unequal size or unequal life spans; is complicated to understand; is tedious and time-consuming to apply; tends to overvalue investments because the method assumes that managers fully exercise options at the optimal time; does not separate the risk of timing from the risk of magnitude; and generates a single number for the valuation result when a probability distribution is more accurate.

As can be seen, there is a need within the art to provide methods and system which accounts for the specific risks of an investment, one that; separates the uncertainty of timing of a future cash flow with the uncertainty of magnitude of a future cash flow; assumes that uncertainty is proportional to the square root or time; is simple and easy to use and can provide a single number estimate for the for an investment or decision if required.

SUMMARY OF THE INVENTION

The present invention relates generally to valuation methods, and more specifically to methods and systems which create a valuation for an investment or decision, and which separates the uncertainty of timing from the uncertainty of magnitude.

According to a first embodiment, a computer implemented method of valuing and modeling an investment is disclosed, the method comprising the steps of: providing at least one investment for consideration, wherein each investment is comprised of at least one future cash flow; creating at least one probability distribution for each future cash flow, by a user, each probability distribution to represent uncertainty of magnitude at at least one particular time to provide at least one magnitude distribution; creating at least one probability distribution for each future cash flow, by a user, each probability distribution to represent the uncertainty of timing at at least one particular magnitude to provide at least one timing distribution; combining the at least one magnitude distribution and at least one timing distribution into at least one joint-probability distribution function; and converting the at least one joint-probability distribution function to generate a two-dimensional net present value probability distribution.

According to another embodiment, a computer implemented method of making a decision through modeling the decision, the method comprising the steps of: providing a first decision for consideration, wherein the decision is comprised of at least one future cash flow; providing at least one image from a library of images; selecting an image for each future cash flow, by a user, to represent the uncertainty of magnitude at at least one particular time to provide at least one magnitude distribution; selecting an image of distribution for each future cash flow, by the user, to represent the uncertainty at at least one particular time to provide at least one timing distribution; combining the magnitude distribution and the timing distribution into a joint-probability distribution function; plotting the joint-probability function on a topography to provide a probability texture; accepting modifications from the user to the probability texture; accepting information from the user about a relationship between possible future events; converting at least two joint-probability functions to generate a two-dimensional net present value probability distribution; accepting modifications from the user to the joint-probability functions and re-generating a two-dimensional net present value probability distribution.

According to yet another embodiment, a computer implemented method of making a decision through modeling the decision, the method comprising the steps of: providing a first decision for consideration, wherein the decision is comprised of at least one future cash flow; providing at least one image from a library of images; selecting an image for each future cash flow, by a user, to represent the uncertainty of magnitude at at least one particular time to provide at least one magnitude distribution; selecting an image of distribution for each future cash flow, by the user, to represent the uncertainty at at least one particular time to provide at least one timing distribution; combining the magnitude distribution and the timing distribution into a joint-probability distribution function; plotting the joint-probability function on a topography to provide a probability texture; accepting modifications from the user to the probability texture; accepting information from the user about a relationship between possible future events; converting at least two joint-probability functions with an algorithm to generate a two-dimensional net present value probability distribution; accepting modifications from the user to the joint-probability functions and re-generating a two-dimensional net present value probability distribution; providing a second decision for consideration, wherein the second decision is comprised of a series of future flows; providing at least one image from a library of images; selecting an image for each future flow, by a user, to represent the uncertainty of magnitude to provide a magnitude distribution; selecting an image of distribution, by the user, to represent the uncertainty in timing to providing a timing distribution; combining the magnitude distribution and the timing distribution into a joint-probability distribution function; plotting the joint-probability function on a topography to provide a probability texture; accepting modifications from the user to the probability texture; accepting information from the user about a relationship between possible future events; converting at least two joint-probability functions with an algorithm to generate a two-dimensional net present value probability distribution; accepting modifications from the user to the joint-probability functions and re-generating a two-dimensional net present value probability distribution; generating at least two two-dimensional net present value probability distributions.

This summary is not to be taken in a limiting sense, but is made merely for the purpose of illustrating the general principles of the invention, since the scope of the invention is best defined by the appended claims.

DETAILED DESCRIPTION OF THE INVENTION

Figure 1:
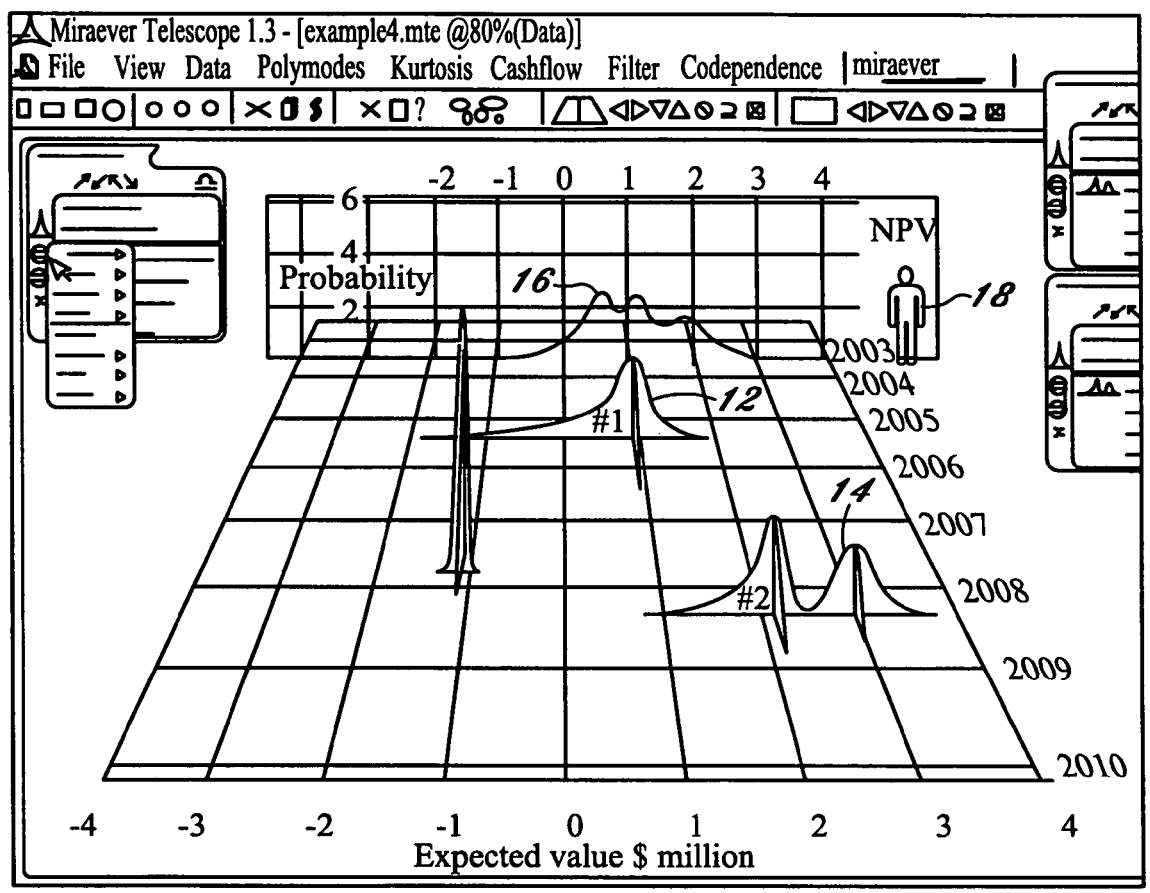
FIG. 1 depicts a screenshot according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a valuation, capital budgeting and investment-decision modeling process that uses three-dimensional textures to represent future cash flows into and out of investments, and uses a two-dimensional surface to display a more accurate valuation result than prior-art valuation methods. The valuation process helps an investor choose the better of two or more investments, including those investments deemed equal through prior-art valuation methods. The program automates many of the process steps, accepts user input (via keyboard, mouse, touch screen or other user-input device), calculates and displays the valuation result on a monitor or other display device. The process allows most users—including those who are relatively innumerate or unskilled in the use of traditional modeling software—to easily, quickly and accurately transfer a large volume of knowledge about a future cash flow into the software and generate a meaningful valuation. An investment can be regarded as a series of future cash outflows and inflows. Each future cash flow will eventually take just one value from a range of values, and the range depends on the risks that influence the future cash flow. For each future cash flow, the new process guides the user to consider the risk of timing separately from the risk of magnitude, and translates user-input into separate probability distribution functions. The process plots values for each function on separate axes to create a joint probability distribution volume which appears to the user as a three-dimensional texture. The user adds as many textures as are necessary to represent all the investment's future cash flows, while the process automatically calculates the value of the investment and displays the result as a two dimensional probability distribution plotted on a surface. The three-dimensional textures and two dimensional valuation result provide the user insight about the investment not revealed through prior art valuation and investment modeling processes. The insight may result in better investment choices.

The terms "valuation", "capital budgeting" and "investment-decision modeling" are used interchangeably and can be generalized as "investment decision rules". The process can value any investment, however, for illustrative purposes, the investment is assumed to be a corporation. A useful investment decision rule helps a user select an investment from among two or more investments such that the chosen investment will be the one with the highest net present value. The net present value of an investment is a current-dollar estimate for the sum of all cash outflows and inflows throughout the investment's life, taking account of the time value of money.

FIG. 1 represents an investment with three cash flows. The example is an investment in a biotech company. The pointy cash flow 10 represents a cash outflow; specifically, a loan repayment. Banks expect an exact amount on an exact date, so the joint-probability distribution for this future cash flow is tall in both axes. The other two cash flows, 12 and 14, are cash inflows. Cash inflows are usually not as certain as cash outflows, so the joint-probability distributions are wide. The panel 16 at the back with the cutout of the person 18 shows the two-dimensional probability valuation result of the investment.

If both types of uncertainty are encapsulated in a three-dimensional textures that represents all states of a future event, then there is no need for multiple discount rates. If there is no need for multiple discount rates, then all three-dimensional textures can be "discounted" by the risk-free rate (representing the time-value of money). If we wish to consider the best estimate now, then now is a single point in time, and the y-axis values, which represent the duration of time, collapse to a single point of time—now. The x-axis values are "projected" back through time to now. Because our method does not use discount rates, the net present value of any future cash flow can be determined accurately for any time between now and the future event date.

The present invention provides a computer implemented method of valuing and modeling an investment. The method comprising the steps of: providing at least one investment for consideration, wherein each investment is comprised of at least one future cash flow; creating at least one probability distribution for each future cash flow, by a user, each probability distribution to represent uncertainty of magnitude at at least one particular time to provide at least one magnitude distribution; creating at least one probability distribution for each future cash flow, by the user, each probability distribution to represent the uncertainty of timing at at least one particular magnitude to provide at least one timing distribution; combining the at least one magnitude distribution and the at least one timing distribution into at least one joint-probability distribution function; and converting the at least one joint-probability distribution function to generate a two-dimensional net present value probability distribution. The step of converting the joint-probability distribution function may be according to an algorithm.

The algorithm may be according to a process of steps. For example, the algorithm may comprise the steps of operating on one or more arrays of data by another, transforming the data into an interim results matrix array; sorting the interim results matrix; converting the sorted-interim results matrix array to two new arrays; combining similar data for each array through internal operations; and producing two final results arrays; and plotting the net-present value distribution according to the two final results arrays.

The computer implemented method of valuing and modeling an investment may further comprise the step of: accepting modifications from the user to one or more joint-probability distributions and re-generating a two-dimensional net present value probability distribution. The method of valuing and modeling an investment may further comprise the steps of: accepting information from the user about a relationship between possible future events; accepting a user modification from the user to the joint-probability distribution function.

The user may also be guided by providing at least two images from a library of images, the images being pre-calculated probability distributions representative of typical categories of cash flows; and accepting a selection of one of at least two images from the user. The at least two images may be images according to category. For example, a real estate investment may usually provide payments on or about the fifth of the month. There may be an image from the library to reflect this. The library may be a library of nine different images. At least one of the at least two images is a default curve that looks like a standard bell curve. The future cash flows may be comprised of at least one positive cash flow and at least one negative cash flow.

The method of valuing and modeling an investment may further comprise the steps of: generating at least two two-dimensional net present value probability distributions; and comparing at least two two-dimensional net present value probability distributions. In this manner investments may be compared and contrasted.

A computer implemented method of making a decision through modeling the decision, the method comprising the steps of: providing a first decision for consideration, wherein the decision is comprised of at least one future cash flow; providing at least one image from a library of images; selecting an image for each future cash flow, by a user, to represent uncertainty of magnitude at at least one particular time to provide at least one magnitude distribution; selecting an image of distribution for each future cash flow, by a user, to represent uncertainty at at least one particular time to provide at least one timing distribution; combining the magnitude distribution and the timing distribution into a joint-probability distribution function; plotting the joint-probability function on a topography to provide a probability texture; accepting modifications from the user to the probability texture; accepting information from a user about a relationship between possible future events; converting at least two said joint-probability functions to generate a two-dimensional net present value probability distribution, this may be according to an algorithm; accepting modifications from the user to the joint-probability functions and re-generating a two-dimensional net present value probability distribution. The step of converting at least two joint-probability functions is according to an algorithm. A method as in claim 12, further comprising the steps of: providing a second decision for consideration, wherein the second decision is comprised of a series of future flows; providing at least one image from a library of images; selecting an image for each future flow, by a user, to represent uncertainty of magnitude to provide a magnitude distribution; selecting an image of distribution, by the user, to represent the uncertainty in timing to providing a timing distribution; combining the magnitude distribution and the timing distribution into a joint-probability distribution function; plotting the joint-probability function on a topography to provide a probability texture; accepting modifications from the user to the probability texture; accepting information from the user about a relationship between possible future events; converting at least two joint-probability functions with an algorithm to generate a two-dimensional net present value probability distribution; accepting modifications from the user to the joint-probability functions and re-generating a two-dimensional net present value probability distribution. The computer implemented method of valuing and modeling an investment may comprise the step of providing at least two images from a library of images; and accepting a selection of one of the at least two images from a user. The at least two images may be according to category. The example library of images is a library of nine, but could be as few as two and as many as necessary. At least one of the at least two images is a default curve that looks like a standard bell curve. The future cash flows may be comprised of at least one positive cash flow and at least one negative cash flow.

The computer implemented method of valuing and modeling an investment may further comprise the steps of: generating at least two two-dimensional net present value probability distributions; and comparing at least two two-dimensional net present value probability distributions.

The computer implemented method of making a decision through modeling the decision may comprise the steps of: providing a first decision for consideration, wherein the decision is comprised of at least one future cash flow; providing at least one image from a library of images; selecting an image for each future cash flow, by a user, to represent the uncertainty of magnitude at at least one particular time to provide at least one magnitude distribution; selecting an image of distribution for each future cash flow, by a user, to represent the uncertainty at at least one particular time to provide at least one timing distribution; combining the magnitude distribution and the timing distribution into a joint-probability distribution function; plotting the joint-probability function on a topography to provide a probability texture; accepting modifications from a user to the probability texture; accepting information from the user about a relationship between possible future events; converting at least two joint-probability functions with an algorithm to generate a two-dimensional net present value probability distribution; accepting modifications from a user to the joint-probability functions and re-generating a two-dimensional net present value probability distribution; providing a second decision for consideration, wherein the second decision is comprised of a series of future flows; providing at least one image from a library of images; selecting an image for each future flow, by a user, to represent the uncertainty of magnitude to provide a magnitude distribution; selecting an image of distribution, by the user, to represent the uncertainty in timing to providing a timing distribution; combining the magnitude distribution and the timing distribution into a joint-probability distribution function; plotting the joint-probability function on a topography to provide a probability texture; accepting modifications from the user to the probability texture; accepting information from the user about a relationship between possible future events; converting at least two joint-probability functions with an algorithm to generate a two-dimensional net present value probability distribution; accepting modifications from the user to the joint-probability functions and re-generating a two-dimensional net present value probability distribution; generating at least two two-dimensional net present value probability distributions. The images are images according to category. The library of images is a library of nine. At least one of the at least two images may be a default curve that looks like a standard bell curve. The future cash flows may be comprised of at least one positive cash flow and at least one negative cash flow. There may be the step of: comparing the at least two two-dimensional net present value probability distributions.

Figure 2:
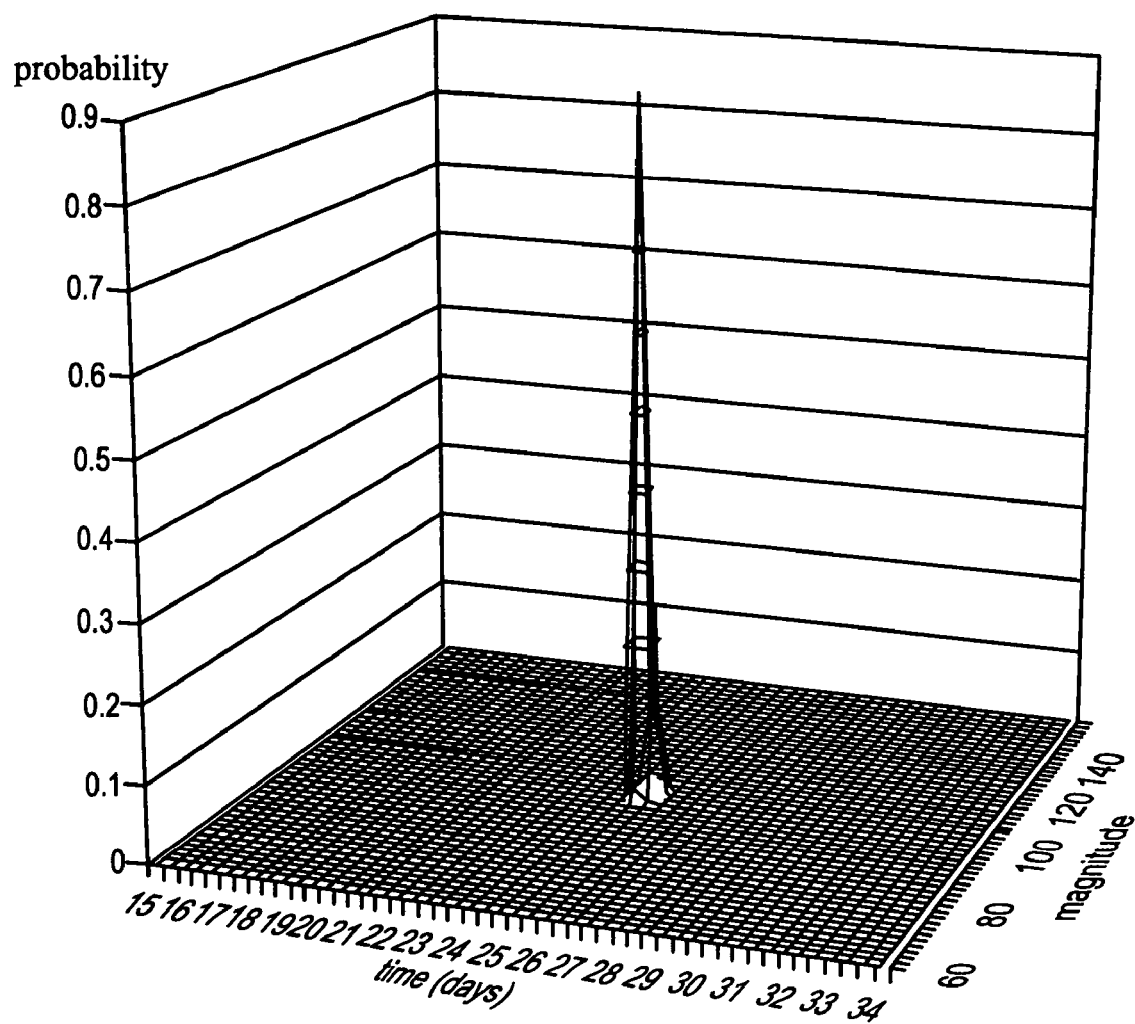
FIG. 2 depicts a joint probability distribution of a future repayment.

FIG. 2, depicts illustration of a joint-probability distribution that represents the future repayment of a bank loan of $106 due in 25 days.

Figure 3:
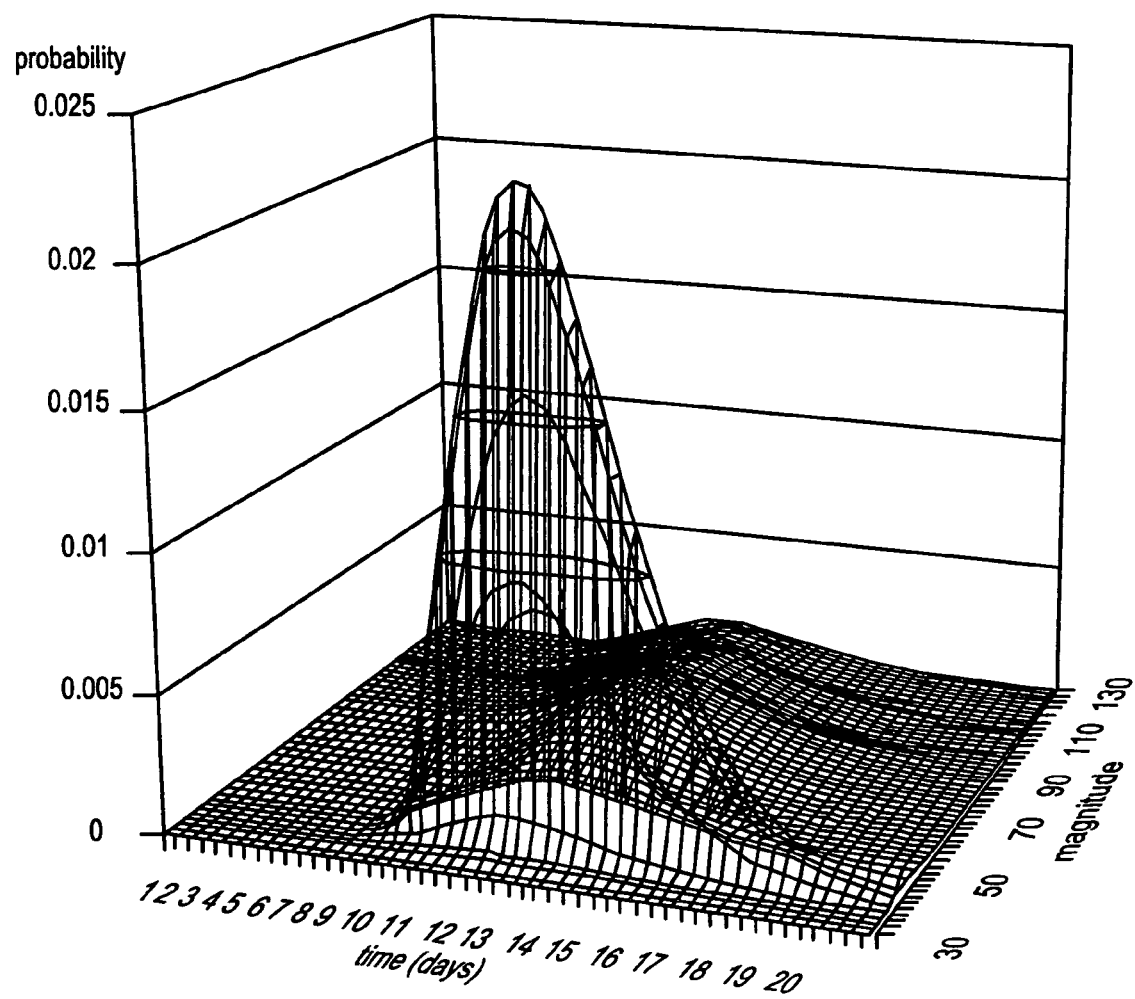
FIG. 3 depicts a joint probability distribution for a future cash flow.

FIG. 3, depicts an illustration of a joint-probability distribution that represents the future cash inflow which could range between $40 to $120. The likelihood of the cash flow having the value of between $50 and $120 is approximately even, however, the likelihood of the cash flow having the value of $40 is approximately ten times that of each of the other values. The cash inflow is expected sometime between 10 and 20 days, however, it is most likely to occur on the 14th day. This example is typical of a cellular telephone provider for certain types of customer.

Figure 4B:
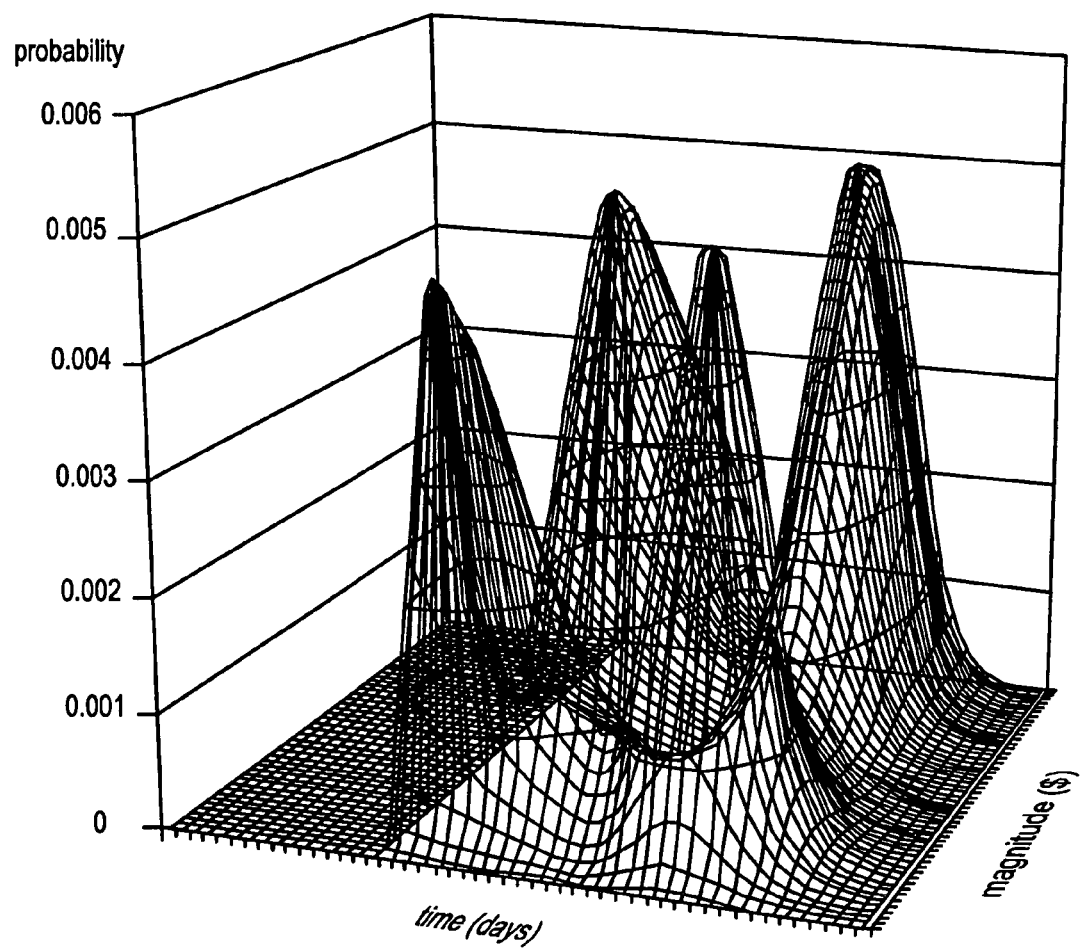
FIG. 4 depicts a multi-modal joint probability distribution for a future cash flow.

FIG. 4 depicts an example of a complex multi-modal joint-probability distribution that represents a future cash inflow which has two likely modes for value and two likely modes for timing. Although complex in shape, this type of cash flow is typical for cash inflows to entertainment companies, yet it would not be practically possible to include all of this knowledge in: prior-art valuation methods. This illustration shows how the user can edit the shapes with sliders to represent the complex, but known, uncertainties that affect some future cash flows. The process can be used to model any future event, not only valuation, as a three-dimensional joint probability distributions and a two-dimensional probability distribution result. All that is required is that the units of the axes be changed. Some examples of possible axis units include: time; units of magnitude of any variable (e.g. money, innocence, health, rainfall, kindness); and probability.

This description is not to be taken in a limiting sense, but is made merely for the purpose of illustrating the general principles of the invention, since the scope of the invention is best defined by the appended claims.

I claim:

1. A computer implemented method of valuing and modeling an investment, said method comprising the steps of:
   providing at least one investment for consideration on a computer, wherein each said investment is comprised of at least one future cash flow;
   creating at least one magnitude probability distribution by said computer for each said future cash flow, by a user, each said probability distribution to represent said uncertainty of magnitude at least one particular time to provide at least one magnitude distribution;
   creating at least one timing probability distribution in said computer for each said future cash flow, by said user, each said probability distribution to represent said uncertainty of timing at least one particular magnitude to provide at least one timing distribution;
   combining said at least one magnitude distribution and said at least one timing distribution by said computer into at least one joint-probability distribution function;
   converting said at least one joint-probability distribution function by said computer to generate a two-dimensional net present value probability distribution; and
   displaying said two-dimensional net present value probability distribution and said at least one joint-probability distribution function on a display device of a computer.

2. A computer implemented method of valuing and modeling an investment as in claim 1, wherein said step of converting said least one joint-probability distribution function is according to an algorithm stored on said computer.

3. A computer implemented method as in claim 2, wherein said algorithm is performed according to the following steps:
   operating on one or more arrays of data by another;
   transforming said data into an interim results matrix array;
   sorting said interim results matrix array to provide a sorted-interim results matrix;
   converting said sorted-interim results matrix array to two new arrays;
   combining data for each array; and
   producing two final results arrays; and
   plotting the net-present value distribution on said computer according to said two final results arrays.

4. A computer implemented method of valuing and modeling an investment as in claim 1, further comprising the step of:
   accepting modifications from said user to one or more said joint-probability distributions and re-generating a two-dimensional net present value probability distribution.

5. A computer implemented method of valuing and modeling an investment as in claim 1, further comprising the step of:
   accepting information from said user about a relationship between possible future events.

6. A computer implemented method of valuing and modeling an investment as in claim 1, further comprising the step of:
   accepting a user modification from said user to said joint-probability distribution function.

7. A computer implemented method of valuing and modeling an investment as in claim 1, further comprising the step of:
   providing at least two images from a library of images, said images being pre-calculated probability distributions representative of typical categories of cash flows; and
   accepting a selection of one of said at least two images from said user.

8. A computer implemented method of valuing and modeling an investment as in claim 7, wherein said at least two images are images according to category.

9. A method as in claim 7, wherein said library is a library of nine.

10. A computer implemented method of valuing and modeling an investment as in claim 7, wherein at least one of said at least two images is a default curve that looks like a standard bell curve.

11. A computer implemented method of valuing and modeling an investment as in claim 1, wherein said future cash flows are comprised of at least one positive cash flow and at least one negative cash flow.

12. A computer implemented method of valuing and modeling an investment as in claim 1, further comprising the steps of:
   generating at least two two-dimensional net present value probability distributions; and
   comparing said at least two two-dimensional net present value probability distributions.

* * * * *